Patented Sept. 8, 1925.

1,552,871

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, FRANCE.

POWDER IMPERMEABLE TO LIQUIDS.

No Drawing. Original application filed April 10, 1924, Serial No. 705,684. Divided and this application filed February 18, 1925. Serial No. 10,147.

*To all whom it may concern:*

Be it known that I, RENÉ OPPENHEIM, a citizen of France, residing at Levallois-Perret, Seine, France, have invented certain new and useful Improvements in Powders Impermeable to Liquids, of which the following is a specification.

The present application is a division of my application No. 705,684, filed April 10, 1924, and the invention relates to a powder consisting of porous particles, which has been rendered impermeable to liquids by the process set forth in said application. The powder forming the subject-matter of the present application retains its properties for use as a catalysis and for the absorption of liquids during longer periods of use.

The process set forth in my said application No. 705,684 is particularly applicable to the impermeabilization of the grains of powder which consist of porous particles, such as powdered wood charcoal, utilized either in an agglomerated state or in a pulverulent state, in electric batteries or accumulators, for the purpose of absorbing the gases evolved by the reactions which take place and to permit the depolarization by the oxygen of the air. By the application of this process the grains of powder forming the subject-matter of the present invention, cannot be penetrated by the liquid of the electrolyte, yet the gases evolved during the working of the battery may readily pass through the same.

The present invention affords the advantages of ensuring to electric batteries, which polarization is performed by air and absorption of the gases evolved by the reaction which takes place, a satisfactory normal working for a longer period of time and to considerably reduce their internal resistance to the passage of the current.

The process for forming the new powder consists particularly in intimately mixing with the powder, a colloidal suspension capable of pectinization, in a quantity sufficient to coat each individual grain of the powder with a pectinized film, impenetrable by liquids but yet permeable to ionized gases.
The powder with the impermeabilized porous grains thus obtained may afterwards be utilized either alone or admixed with a depolarizer, such as manganese dioxide, for example. This powder will be enclosed in a porous receptacle of earthenware or fabric, or will be compressed into the form of briquettes.

By way of explanation, I will proceed to describe a mode of application for producing the impermeabilization of a wood charcoal powder designed to be used in the manufacture of electric batteries, in which depolarization is performed by the oxygen of the air.

Into a vessel containing about 30 kilogrammes of ordinary wood charcoal, in powdered form, to which powdered graphite may be added for the purpose of increasing its conductivity, there is poured a colloidal suspension, prepared for example, in the following manner:—

875 grammes of fecula are dissolved in 1 litre of cold water and this solution is afterwards mixed with about 9 litres of water heated to a temperature of about 85° C.

After it has cooled down, this colloidal suspension is poured over the powdered wood charcoal, to which powdered graphite may or may not have been added, and the whole mass is stirred so as to obtain as intimate a mixture as possible.

During this stirring, the colloidal suspension forms on the surface of each grain of the powdered wood charcoal, a coagulum which dries until pectinization takes place.

Each grain of the powder forming the subject-matter of the present application, is therefore enveloped by this pectinized coagulum, which constitutes a film-like coating functioning to protect it against any ulterior penetration by liquids.

It should be noted that owing to the rapidity with which the coagulum is formed and its immediate pectinization, each porous grain is immediately isolated from the colloidal suspension, and the duration of the stirring of the powder with this latter has no influence on the thickness of the film formed on each grain. Only an extremely thin film-like covering can therefore form with any penetration of the colloidal material into the mass of each of the porous grains, and consequently these latter always retain their properties of absorption and adsorption of the gases.

The product thus obtained (the grains of which are now impermeabilized) can be used either in dry batteries or those in which the liquid is stationary, and even in accumulators. It may be used with or without manganese dioxide, either in the form of powder or in an agglomerated form according to the type of battery or accumulator with which it is to be employed. In the latter case, the powder is rammed around the positive electrode of the battery, into a porous vessel of earthenware of the ordinary kind or into a fabric receptacle, and in the second case the powder is compressed into the form of blocks or briquettes agglomerated onto the positive electrode of the battery or affixed thereto by any well known means.

For the constitution of the colloidal suspension utilized in the process of forming the improved powder, I may employ instead of the fecula specified above, any other suitable material, such for example as arrowroot, gelatinous silica, fish glue or a mineral soap, say a metallic oleo-margarate, such as oleo-margarate of zinc, these colloidal suspensions being prepared, as described in my prior applications for patents Serial No. 571,926, filed June 30, 1922, and 669,625 filed October 19, 1923.

When fecula is used I may add thereto a certain proportion of gelatin, for example 20 to 30 grammes per litre of suspension, for the purpose of retarding the pectinization, and to eliminate cracks in the pectinized colloid, particularly in cases where the latter is to be agglomerated under severe compression.

The proportions of the elements employed in the process for forming the improved powder may be modified according to the applications thereof.

Claims:

1. A powder consisting of porous grains enveloped by pectinized coagulum forming a film-like coating on the grains and protecting the same against any ulterior penetration by liquid, while permitting any free penetration by gases.

2. A powder of porous grains of charcoal, each enveloped by pectinized coagulum forming a film-like coating to protect it against any ulterior penetration by liquid.

3. As a new article of manufacture, a pulverulent mixture of powdered charcoal and graphite, the grains of the powdered charcoal each being enveloped by pectinized coagulum forming a film-like coating to protect it against any ulterior penetration by liquid.

4. As a new article of manufacture, pulverulent material consisting of a mixture of powdered charcoal, graphite and manganese dioxide, the grains of the pulverulent mixture being enveloped by pectinized coagulum forming a film-like coating to protect them against any ulterior penetration by liquid.

5. The new product constituted by a powder composed of porous grains rendered impermeable by mixing the same with a colloidal suspension capable of pectinization, in such a way that each of the grains of this powder is covered individually with a pectinized film impenetrable by liquids.

In testimony whereof I hereunto affix my signature.

RENÉ OPPENHEIM.